(12) United States Patent
Vatinel et al.

(10) Patent No.: US 8,885,694 B2
(45) Date of Patent: Nov. 11, 2014

(54) CHANGING AN OPERATING PERFORMANCE POINT

(75) Inventors: Christophe Pierre Vatinel, Mouans Sartoux (FR); Jerome Henri Loisel, Mougins (FR)

(73) Assignee: Texas Instruments Incorporated, Dallas, TX (US)

( * ) Notice: Subject to any disclaimer, the term of this patent is extended or adjusted under 35 U.S.C. 154(b) by 230 days.

(21) Appl. No.: 12/878,640

(22) Filed: Sep. 9, 2010

(65) Prior Publication Data

US 2011/0057702 A1 Mar. 10, 2011

(30) Foreign Application Priority Data

Sep. 9, 2009 (EP) .................................... 09290687

(51) Int. Cl.
| | |
|---|---|
| *H04B 3/46* | (2006.01) |
| *H04B 17/00* | (2006.01) |
| *H04Q 1/20* | (2006.01) |
| *G06F 1/32* | (2006.01) |

(52) U.S. Cl.
CPC ........... *G06F 1/3203* (2013.01); *Y02B 60/1285* (2013.01); *G06F 1/3296* (2013.01); *G06F 1/324* (2013.01); *Y02B 60/1217* (2013.01)
USPC ............................ 375/224; 375/219; 375/354

(58) Field of Classification Search
USPC .......... 375/219–221, 224, 354, 358; 713/300, 713/320, 322, 340
See application file for complete search history.

(56) References Cited

U.S. PATENT DOCUMENTS

| | | | |
|---|---|---|---|
| 6,493,320 B1 * | 12/2002 | Schober et al. ............... | 370/241 |
| 7,730,340 B2 | 6/2010 | Hu et al. | |
| 7,739,531 B1 | 6/2010 | Krishnan | |
| 7,882,369 B1 * | 2/2011 | Kelleher et al. ............... | 713/300 |
| 2003/0065960 A1 * | 4/2003 | Rusu et al. .................... | 713/300 |
| 2004/0044915 A1 * | 3/2004 | Bose et al. .................... | 713/320 |
| 2004/0107375 A1 * | 6/2004 | Anglada ....................... | 713/400 |
| 2005/0071705 A1 * | 3/2005 | Bruno et al. .................. | 713/500 |
| 2005/0218871 A1 * | 10/2005 | Kang et al. .................... | 323/265 |
| 2006/0074576 A1 * | 4/2006 | Patel et al. ...................... | 702/64 |
| 2006/0290365 A1 * | 12/2006 | Riedlinger et al. ........... | 324/760 |
| 2007/0058477 A1 * | 3/2007 | Chiang et al. ................. | 365/233 |
| 2007/0061606 A1 * | 3/2007 | Wilson et al. ................. | 713/500 |
| 2007/0168686 A1 * | 7/2007 | Pessolano .................... | 713/500 |
| 2007/0220289 A1 * | 9/2007 | Holle et al. .................... | 713/300 |
| 2007/0229054 A1 * | 10/2007 | Dobberpuhl et al. ...... | 324/76.11 |
| 2008/0276116 A1 * | 11/2008 | Bjerregaard ................. | 713/501 |
| 2009/0125738 A1 * | 5/2009 | Murakami .................... | 713/322 |

* cited by examiner

*Primary Examiner* — Jean B Corrielus
(74) *Attorney, Agent, or Firm* — Ronald O. Neerings; Frederick J. Telecky, Jr.

(57) ABSTRACT

A method of changing an operating performance point of an integrated circuit including detecting a need to change the operating performance point of the integrated circuit to a new operating performance point. The method also includes changing a voltage of the integrated circuit to correspond with the new operating performance point, changing a maximal receiver clock frequency value to correspond with the new operating performance point, exporting the maximal receiver clock frequency value to a distant integrated circuit, and receiving an acknowledgement of the changed maximal receiver clock frequency value from the distant integrated circuit.

14 Claims, 5 Drawing Sheets

CHANGING AN OPERATING PERFORMANCE POINT

CROSS-REFERENCE TO RELATED APPLICATION

The present application claims priority to EP Provisional Patent Application No. 092906847.4, filed on Sep. 9, 2009; which is hereby incorporated herein by reference.

BACKGROUND

Integrated circuits may utilize dynamic voltage scaling and/or dynamic frequency scaling to reduce power consumption when full performance is not needed. Dynamic frequency scaling is a power management technique where the frequency of a microprocessor can be automatically adjusted. The frequency may be adjusted downwards to conserve power or may be adjusted upwards to increase performance. Similarly, dynamic voltage scaling is a power management technique where the voltage used in a microprocessor can be automatically adjusted. The voltage may be adjusted downwards to conserve power or may be adjusted upwards to increase performance.

Some systems may comprise more than one integrated circuit. These systems use a transport clock to transmit data between the devices. The frequency of the transport clock is fixed by a protocol. For example, a universal serial bus (USB) high speed interface is defined to operate using a transport clock having a frequency of 480 MHz. Although the operating frequency and/or voltage of the integrated circuits may be adjusted, the frequency or voltage requirements of the transport clock between integrated circuits are fixed.

SUMMARY

The problems noted above are solved in large part by embodiments including a method of changing an operating performance point of an integrated circuit comprising detecting a need to change the operating performance point of the integrated circuit to a new operating performance point. The method further comprises changing a voltage of the integrated circuit to correspond with the new operating performance point, changing a maximal receiver clock frequency value to correspond with the new operating performance point, exporting the maximal receiver clock frequency value to a distant integrated circuit, and receiving an acknowledgement of the changed maximal receiver clock frequency value from the distant integrated circuit.

Other embodiments include a method of changing a frequency of a transmit clock of an integrated circuit comprising receiving a maximal transmit clock frequency value. The method further comprises changing the frequency of the transmit clock such that the frequency is less than or equal to the maximal transmit clock frequency value and exporting an acknowledgement of the maximal transmit clock frequency value to a distant integrated circuit.

Still other embodiments include an integrated circuit comprising a transmit clock adapter configured to change a frequency of a transmit clock, a transmitter, and a receiver. The receiver receiving a maximal transmit clock frequency value causes the transmit clock adapter to change the frequency of the transmit clock such that the frequency is less than or equal to the maximal transmit clock frequency value. The transmitter exports an acknowledgement of the maximal transmit clock frequency value to a distant integrated circuit.

Yet other embodiments include a system comprising a first and second integrated circuit, each comprising a transmit clock adapter configured to change a frequency of a transmit clock, a transmitter, and a receiver. If the first integrated circuit changes to a new operating performance point, then the first integrated circuit changes a voltage to correspond with the new operating performance point, changes a maximal receiver clock frequency value to correspond with the new operating performance point, and the transmitter of the first integrated circuit exports the maximal receiver clock frequency value to the second integrated circuit. If the second integrated circuit receives a changed maximal receiver clock frequency value from the first integrated circuit, being the maximal transmit clock frequency value of the second integrated circuit, then the transmit clock adapter of the second integrated circuit changes the frequency of the transmit clock such that the frequency is less than or equal to the maximal transmit clock frequency value and the transmitter of the second integrated circuit exports an acknowledgement of the maximal transmit clock frequency value to the first integrated circuit.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
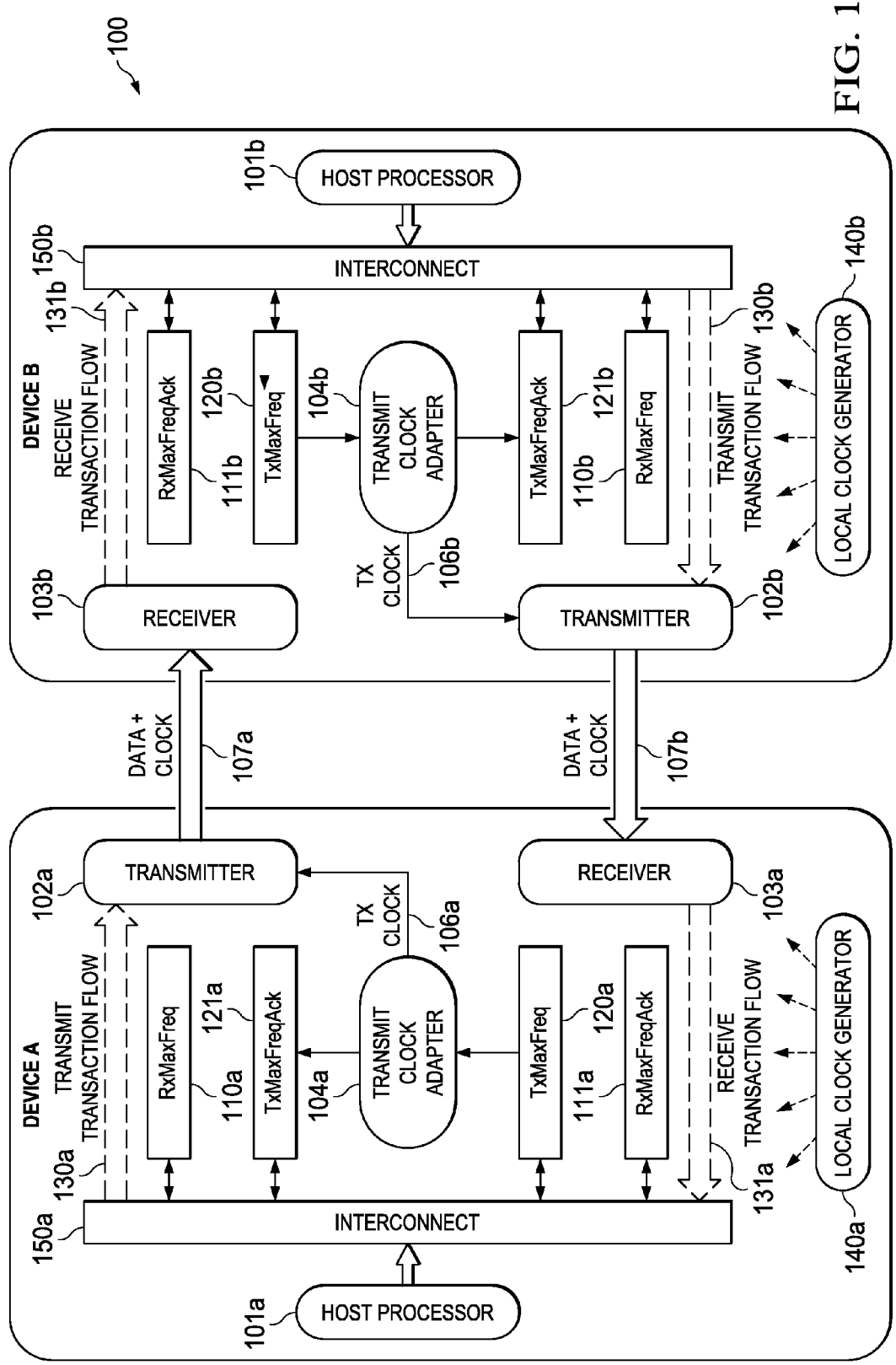
FIG. 1 shows a system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with various embodiments, two integrated circuits (ICs) are connected by a digital data duplex link and each transmitter interface sends data along with a source synchronous transport clock to the receiver interface. The transport clock is the transmit clock (TX_clock) for the transmitter interface and is the receive clock (RX_clock) for the receiver interface. The receiver interface uses the transport clock to sample the data received over the link. The two ICs are capable of performing operations at different clock rates. Additionally, the transport clock rate at which either IC interfaces with the other can change dynamically. Furthermore, the transmit clock generated by each IC need not be the same frequency as the transmit clock generated by another IC. The transmitter interface uses a transport clock frequency that is optimized with an operating performance point (OPP) of the receiver and that is also compliant with its own OPP.

An OPP is characterized by several factors, including a voltage range and a maximal frequency at which the IC can operate for each of its clock domains (e.g., TX_clock domain and RX_clock domain). Each OPP specifies an operating voltage and a maximal frequency limit for both RX_clock and TX_clock (RxMaxFreq and TxMaxFreq, respectively). The maximal frequency limit for TX_clock and RX_clock need not be the same for a given OPP. For example, the following table illustrates two exemplary OPPs:

| OPP Name | Voltage | RxMaxFreq | TxMaxFreq |
|---|---|---|---|
| OPP1 | 1.2 V | 200 MHz | 250 MHz |
| OPP2 | 1.0 V | 100 MHz | 125 MHz |

Additionally, an OPP may include maximal frequencies allowed for other clocks associated with the IC, for example internal clocks generated by a local clock generator.

Configuring an IC to operate at more than one OPP enables a reduction in power consumption of the IC. Depending on the load placed on the IC, a processor may determine to change the OPP to minimize the voltage while still guaranteeing that the required frequency performance is maintained. For example, if an IC is operating at OPP1 and enters a use-case where all the required frequencies are below the maximal ranges allowed by OPP2, then the processor may determine to switch from OPP1 to OPP2. The dynamic power (i.e., switching power) dissipated by a chip is given by $C \cdot V^2 \cdot f$, where C is the capacitance being switched per clock cycle, V is the applied voltage and f is the switching frequency. Thus, by switching from OPP1 to OPP2, the dynamic power consumption of the IC is reduced by about 30% (i.e., $1.0^2/1.2^2$). Similarly, if an IC is operating at OPP2 and enters a use-case where at least some frequencies are required to be above the maximal ranges allowed by OPP2, then the processor may determine to switch from OPP2 to OPP1, which increases the performance of the IC.

In accordance with various embodiments, an exemplary system 100 is provided in FIG. 1. Devices A and B represent, for example, ICs as discussed above. In an exemplary embodiment, each of Devices A and B are mirror-images of the other; that is, they contain identical component functionality. Although certain processes and components may be described with respect to only one of Devices A and B for simplicity, one skilled in the art would appreciate that either device may perform such processes. Device A comprises a host processor 101a, a transmitter 102a and a receiver 103a. The transmitter 102a is configured to send data as well as TX_clock 106a, 107a to the "distant" IC (in this case, Device B) and receiver 103a is configured to receive data as well as TX_clock 106b, 107b from the distant IC. Device A further comprises a transmit clock adapter 104a that generates TX_clock 106a and provides TX_clock 106a to the transmitter 102a. Still further, Device A comprises registers that may contain values for maximal frequencies specified by an OPP or acknowledgements of such maximal frequencies. RxMaxFreq 110a contains the maximal receiver clock frequency value, RxMaxFreqAck 111a contains an acknowledgement of the maximal receiver clock frequency value, TxMaxFreq 120a contains the maximal transmit clock frequency value, and TxMaxFreqAck 121a contains an acknowledgement of the maximal transmit clock frequency value.

Additionally, Device A comprises a local clock generator 140a that generates one or more internal clock signals. The internal clock signals may be used by the components of Device A, for example the transmit clock adapter 104a to generate TX_clock 106a. Interconnect 150a represents the interconnection of the address space of Device A and may comprise, for example, a system on a chip (SoC) level interconnect, a local interconnect, bridges, etc. The interconnect 150a generates the transmit transaction flow 130a to send data to a distant IC and receives the receive transaction flow 131a of data from a distant IC.

Figure 2:
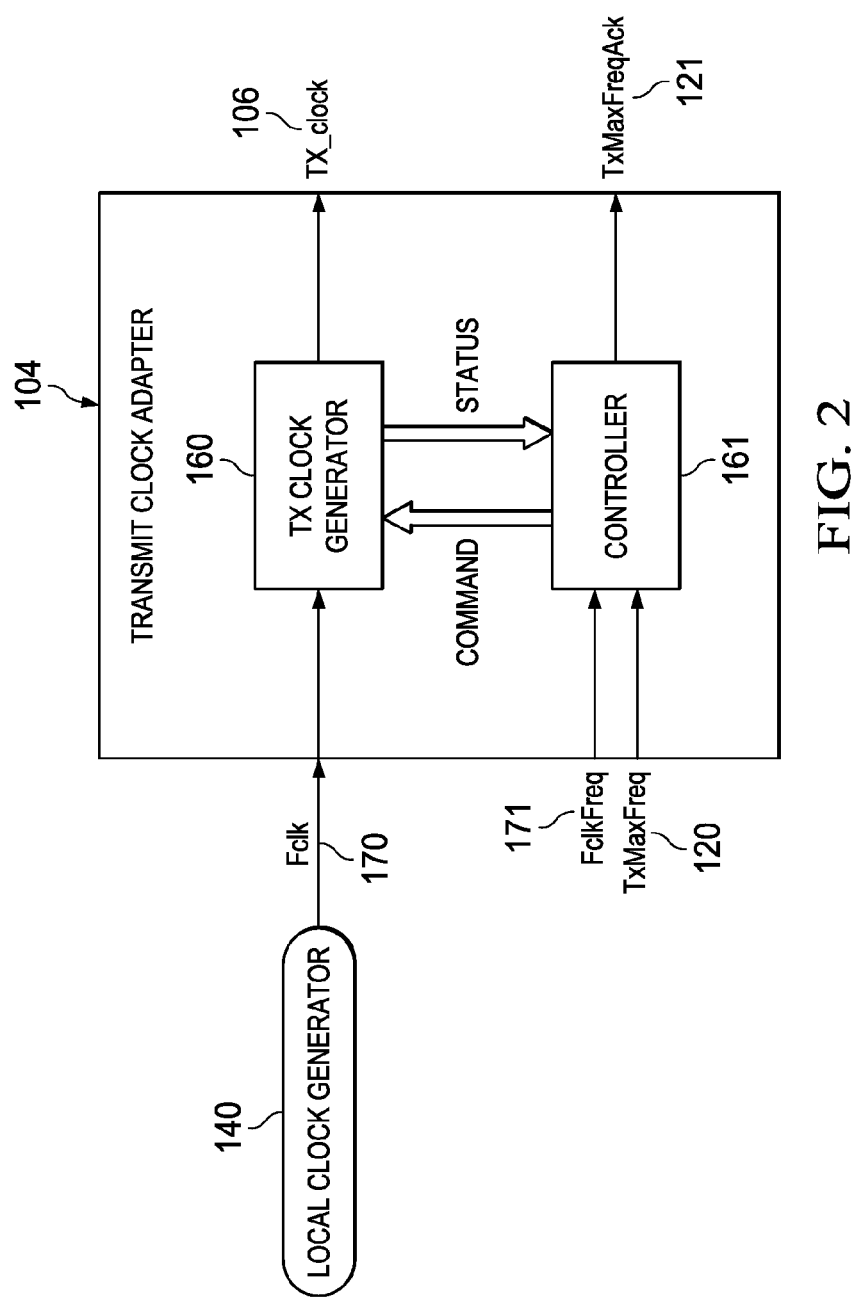
FIG. 2 shows a component of the system of FIG. 1 in accordance with various embodiments.

In accordance with various embodiments, the transmit clock adapter 104 is shown in greater detail in FIG. 2. Each component of the transmit clock adapter 104 is shown as either 'a' or 'b', representing the fact that these components exist on both Devices A and B, respectively. The transmit clock adapter 104 comprises a TX clock generator 160 and a controller 161. The TX clock generator 160 receives an internal clock signal (e.g., Fclk 170) from the local clock generator 140 and outputs TX_clock 106. The TX clock generator 160 may comprise, for example, a phase-locked loop (PLL) or other clock generating device.

The controller 161 receives or monitors the values of TxMaxFreq 120 and a value that indicates the frequency of Fclk 170 (e.g., FclkFreq 171) and generates N=ceiling (FclkFreq/TxMaxFreq). For example, if FclkFreq 171 is 400 MHz and TxMaxFreq 120 is 250 MHz, N is equal to the ceiling of 1.6, or 2. The TX clock generator 160 receives N from the controller 161 and generates TX_clock 106 by dividing Fclk 170 by N, for example using a PLL. For example, if Fclk 170 is 400 MHz and N is determined by the controller 161 to be 2, the TX clock generator 160 will output a TX_clock 106 having a frequency of 200 MHz. One skilled in the art would appreciate that the above scheme is exemplary, and other schemes for generating TX_clock 106 are possible as well. For example, in some embodiments, a PLL may generate TX_clock 106 to be equal to the value of TxMaxFreq 120.

The controller 161 also receives or monitors a status from the TX clock generator 160 that may, for example, indicate the value of TX_clock 106. The controller 161 monitors the status to ensure coherency between the input values (i.e., FclkFreq 171 and TxMaxFreq 120) and the TX_clock 106 that is generated by the TX clock generator 160. When changing from one TX_clock frequency to another, there may be a number of cycles in which the frequency of TX_clock 106 is transient and not settled. The controller 161 determines when the frequency of TX_clock 106 settles and copies TxMaxFreq 120 into TxMaxFreqAck 121, acknowledging that TX_clock 106 is operating at the correct frequency. Alternatively, the controller 161 determines when the frequency of TX_clock 106 is guaranteed to be below or equal to TxMaxFreq 120 and copies TxMaxFreq 120 into TxMaxFreqAck 121, acknowledging that TX_clock 106 is operating within the correct frequency limit.

Referring back to FIG. 1, in accordance with various embodiments, Device A determines that its OPP may be lowered (i.e., from OPP1 to OPP2). The host processor 101*a* may determine that the OPP may be lowered because the current use of Device A is such that performance would not be reduced by lowering all frequencies to within the range specified by OPP2. Thus, the host processor 101*a* configures the local clock generator 140*a* to generate all local clocks compliant with the new OPP. For simplicity, it is assumed that the maximal local clock frequency is the same for both OPP1 and OPP2, although one skilled in the art would understand that the maximal local clock frequency may be lower for OPP2 than for OPP1, thus requiring a change in Fclk 170. Next, RxMaxFreq 110*a* is written with the maximal frequency limit of the RX_clock for OPP2, which in the above table is 100 MHz.

When RxMaxFreq 110*a* is updated, TxMaxFreq 120*b* of the distant IC (i.e., Device B) is updated to contain the same value. This may be accomplished by hardware, a software interrupt, or other process known to those skilled in the art. As discussed above, a change in TxMaxFreq 120*b* on the distant IC causes the transmit clock adapter 104*b* to generate TX_clock 106*b* based on the value in TxMaxFreq 120*b*. In this case, the controller 161*b* generates N=ceiling (400 MHz/100 MHz)=4, and thus TX_clock 106*b* generated by the transmit clock adapter 104*b* of Device B has a frequency equal to Fclk 170*b* divided by 4, or 100 MHz. This particular generation of N is exemplary only, and TX_clock 106*b* may be generated in other suitable manners. When the controller 161*b* determines that the frequency of TX_clock 106*b* is non-transient and settled, or is at or below the value of TxMaxFreq 120*b*, the controller 161*b* copies the value from TxMaxFreq 120*b* to TxMaxFreqAck 121*b*, acknowledging that TX_clock 106*b* is operating at the correct frequency.

When TxMaxFreqAck 121*b* is updated, RxMaxFreqAck 111*a* of Device A is updated to contain the value of TxMaxFreqAck 121*b*. As with RxMaxFreq 110*a* and TxMaxFreq 120*b*, this may be accomplished by hardware, a software interrupt, or other process known to those skilled in the art. When the value of RxMaxFreqAck 111*a* reflects the value of RxMaxFreq 110*a*, the transport frequency from Device B is guaranteed to be within the maximal ranges specified by OPP2 and the distant IC has updated TX_clock 106*b* to facilitate communication with Device A using the new OPP, in this case OPP2. Thus, the host processor 101*a* may cause Device A to lower its voltage from 1.2V to 1.0V, since the transport frequency from Device B is guaranteed to be within the maximal ranges specified by OPP2.

Still referring to FIG. 1, in accordance with various other embodiments, Device A determines that its OPP needs to be raised (i.e., from OPP2 to OPP1). The host processor 101*a* may determine that the OPP needs to be raised because the current use of Device A is such that a higher maximal frequency range than those specified by OPP2 is needed for at least one of the operating frequencies. Thus, the host processor 101*a* causes Device A to raise its voltage from 1.0V to 1.2V in preparation for receiving data from Device B using a transport frequency that is higher than that specified by OPP2. Next, RxMaxFreq 110*a* is written with the maximal frequency limit of the RX_clock for OPP1, which in the above table is 200 MHz.

When RxMaxFreq 110*a* is updated, TxMaxFreq 120*b* of the distant IC (i.e., Device B) is updated to contain the same value. This may be accomplished by hardware, a software interrupt, or other process known to those skilled in the art. As discussed above, a change in TxMaxFreq 120*b* on the distant IC causes the transmit clock adapter 104*b* to generate TX_clock 106*b* based on the value in TxMaxFreq 120*b*. In this case, the controller 161*b* generates N=ceiling (400 MHz/200 MHz)=2, and thus TX_clock 106*b* generated by the transmit clock adapter 104*b* of Device B has a frequency equal to Fclk 170*b* divided by 2, or 200 MHz. As above, this particular generation of N is exemplary only, and TX_clock 106*b* may be generated in other suitable manners. When the controller 161*b* determines that the frequency of TX_clock 106*b* is non-transient and settled, or is at or below the value of TxMaxFreq 120*b*, the controller 161*b* copies the value from TxMaxFreq 120*b* to TxMaxFreqAck 121*b*, acknowledging that TX_clock 106*b* is operating at the correct frequency.

When TxMaxFreqAck 121*b* is updated, RxMaxFreqAck 111*a* of Device A is updated to contain the value of TxMaxFreqAck 121*b*. As with RxMaxFreq 110*a* and TxMaxFreq 120*b*, this may be accomplished by hardware, a software interrupt, or other process known to those skilled in the art. When the value of RxMaxFreqAck 111*a* reflects the value of RxMaxFreq 110*a*, the transport frequency from Device B is guaranteed to be within the maximal ranges specified by OPP1 and the distant IC has updated TX_clock 106*b* to facilitate communication with Device A using the new OPP, in this case OPP1. Thus, the host processor 101*a* configures the local clock generator 140*a* to generate all local clocks compliant with the new OPP. For simplicity, it is assumed that the maximal local clock frequency is the same for both OPP1 and OPP2, although one skilled in the art would understand that the maximal local clock frequency may be higher for OPP1 than for OPP2, thus requiring a change in Fclk 170*a*.

In accordance with various embodiments, each IC may generate a different frequency TX_clock 106 than another IC. For example, Device A uses an OPP that results in Device B generating TX_clock 106*b* of 200 MHz while Device B uses an OPP that results in Device A generating TX_clock 106*a* of 100 MHz. Each TX_clock 106 may also be different than a local clock, or a clock that is used by the host processor 101. Thus, one skilled in the art would appreciate that each TX_clock 106 (i.e., transport clock between two or more ICs) may be optimized independently of other local or system clocks.

Figure 3:
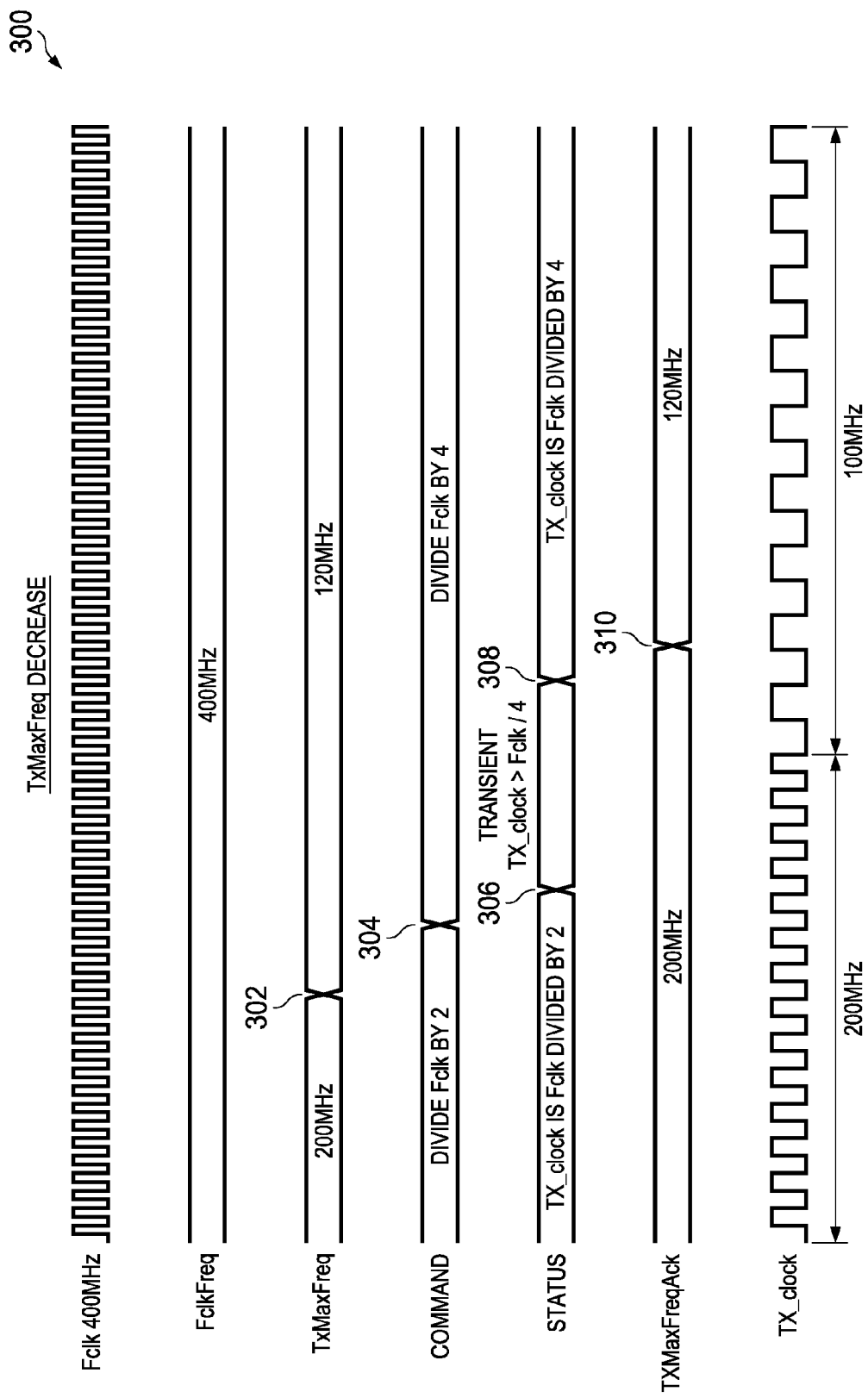
FIG. 3 shows a timing chart in accordance with various embodiments.

FIG. 3 shows a timing chart 300 for a reduction in OPP in accordance with various embodiments; the timing chart 300 does not refer to the above table of OPP values. The timing chart 300 is exemplary and is in reference to the IC that changes its TX_clock 106*b* (Device B in the above example) in response to a distant IC changing its OPP. At time 302, TxMaxFreq 120*b* is reduced from 200 MHz to 120 MHz, which is caused by the reduction of the value of RxMaxFreq 110*a* at a distant IC (e.g., Device A). This may be accomplished by hardware, a software interrupt, or other process known to those skilled in the art. At time 304, the controller 161*b* of the transmit clock adapter 104*b* generates N=ceiling (400 MHz/120 MHz)=4, and sends a command to the TX clock generator 160*b* to divide Fclk 170*b* by 4. During the period from time 306 to time 308, TX_clock 106*b* is transient and is greater than Fclk/4. Additionally, during the period from time 302 to time 310, TX_clock 106*b* must remain below the maximum of TxMaxFreq 120*b* and TxMaxFreqAck 121*b*. However, at time 308, the controller 161*b* determines TX_clock 106*b* to be non-transient, and thus copies TxMaxFreq 120*b* into TxMaxFreqAck 121*b* at time 310.

As discussed above with respect to FIGS. 1 and 2, RxMaxFreqAck 111*a* of the distant processor is updated to contain the value of TxMaxFreqAck 121*b*. When the value of RxMaxFreqAck 111a reflects the value of RxMaxFreq 110a, the transport frequency from Device B is guaranteed to be within the maximal ranges specified by the new OPP and TX_clock 106b is updated to facilitate communication with Device A using the new OPP.

Figure 4:
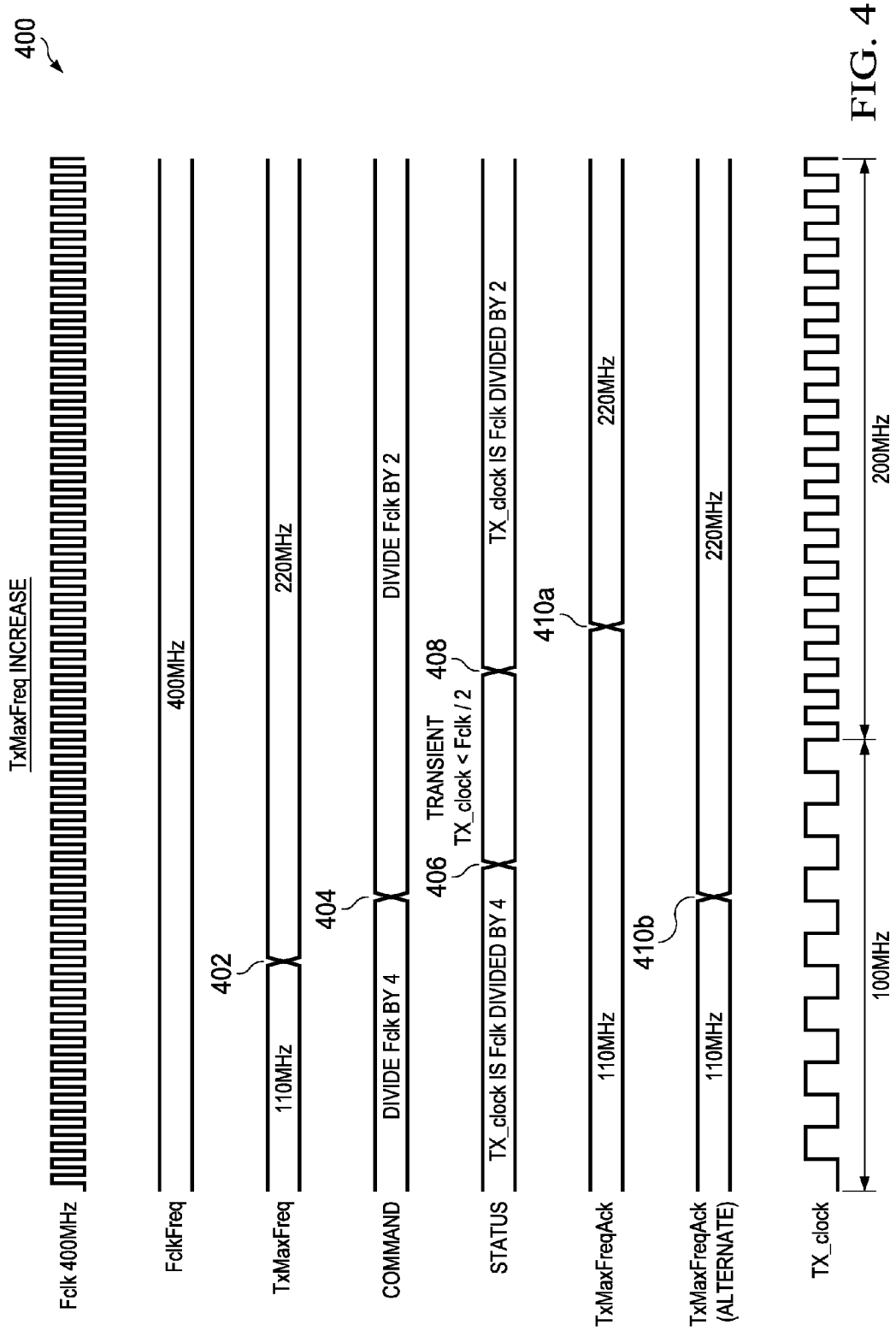
FIG. 4 shows another timing chart in accordance with various embodiments.

FIG. 4 shows another timing chart 400 for an increase in OPP in accordance with various embodiments; the timing chart 400 does not refer to the above table of OPP values. The timing chart 400 is exemplary and is in reference to the IC that changes its TX_clock 106b (Device B in the above examples) in response to a distant IC changing its OPP. At time 402, TxMaxFreq 120b is increased from 110 MHz to 220 MHz, which is caused by the increase of the value of RxMaxFreq 110a at a distant IC (e.g., Device A). This may be accomplished by hardware, a software interrupt, or other process known to those skilled in the art. At time 404, the controller 161b of the transmit clock adapter 104b generates N=ceiling (400 MHz/220 MHz)=2, and sends a command to the TX clock generator 160b to divide Fclk 170b by 2. During the period from time 406 to time 408, TX_clock 106b is transient and is less than Fclk/2. Additionally, during the period from time 402 to time 410a, TX_clock 106b must remain below the maximum of TxMaxFreq 120b and TxMaxFreqAck 121b. However, at time 408, the controller 161b determines TX_clock 106b to be non-transient, and thus copies TxMaxFreq 120b into TxMaxFreqAck 121b at time 410a. Alternatively, the controller 161b determines that TX_clock 106b is at or below the value of TxMaxFreq 120b when TxMaxFreq 120b increases to 220 MHz at time 402. Thus, the controller 161b may copy TxMaxFreq 120b into TxMaxFreqAck 121b at time 410b.

As discussed above with respect to FIGS. 1 and 2, RxMaxFreqAck 111a of the distant processor is updated to contain the value of TxMaxFreqAck 121b. When the value of RxMaxFreqAck 111a reflects the value of RxMaxFreq 110a, the transport frequency from Device B is guaranteed to be within the maximal ranges specified by the new OPP and TX_clock 106b is updated to facilitate communication with Device A using the new OPP.

Figures 5, 6:
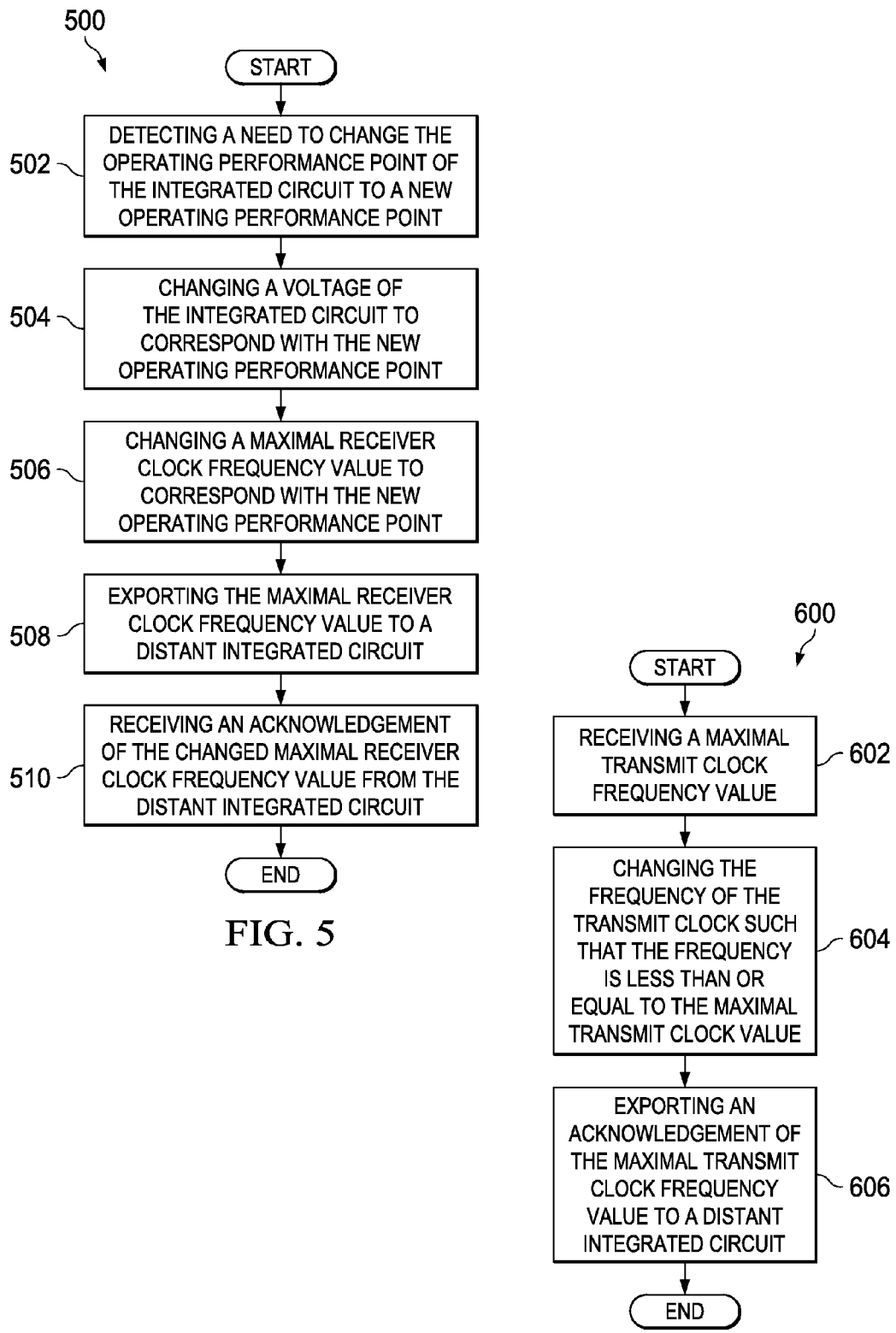
FIG. 5 shows a method flow chart in accordance with various embodiments.
FIG. 6 shows another method flow chart in accordance with various embodiments.

FIG. 5 shows a method 500 of changing an operating performance point of an IC in accordance with various embodiments. The method 500 begins by detecting a need to change the OPP of the IC to a new OPP (block 502). As discussed above, the IC may be, for example, Device A and the host processor 101a may detect the need to change from one OPP to a new OPP. For example, if the IC is operating at OPP1 and enters a use-case where all the required frequencies are below the maximal ranges allowed by OPP2, then the processor may determine to switch from OPP1 to OPP2. Similarly, if the IC is operating at OPP2 and enters a use-case where at least some frequencies are required to be above the maximal ranges allowed by OPP2, then the processor may determine to switch from OPP2 to OPP1, which increases the performance of the IC.

The method 500 comprises changing a voltage of the IC to correspond with the new OPP (block 504). In embodiments where the OPP is being reduced (e.g., from OPP1 to OPP2), the host processor 101a may cause Device A to lower its voltage from 1.2V to 1.0V, since the transport frequency from Device B is guaranteed to be within the maximal ranges specified by OPP2. In alternative embodiments where the OPP is being increased (e.g., from OPP2 to OPP1), the host processor 101a may cause Device A to raise its voltage from 1.0V to 1.2V in preparation for receiving data from Device B using a transport frequency that is higher than those specified by OPP2.

The method 500 further comprises changing a maximal receiver clock frequency value (e.g., RxMaxFreq 110a) to correspond with the new OPP (block 506) and exporting RxMaxFreq 110a to a distant IC, for example Device B (block 508). Additionally, the method 500 comprises receiving an acknowledgement of the changed RxMaxFreq 110a from the distant IC (block 510). As discussed above, RxMaxFreq 110a may be exported to the distant IC through hardware, a software interrupt or other process known to those skilled in the art. Once Device A receives an acknowledgement from the distant IC, which in some embodiments may occur when RxMaxFreqAck 111a is changed to equal RxMaxFreq 110a, the transport frequency from Device B is guaranteed to be within the maximal ranges specified by the new OPP and the distant IC has updated TX_clock 106b to facilitate communication with Device A using the new OPP. The method then ends.

FIG. 6 shows a method 600 of changing a frequency of a transmit clock of an IC in accordance with various embodiments. The method 600 begins by receiving a maximal transmit clock frequency value (e.g., TxMaxFreq 120b) (block 602). As discussed above, TxMaxFreq 120b may be updated as a result of RxMaxFreq 110a changing on a distant IC. TxMaxFreq 120b may be received by way of hardware, a software interrupt or other process known to those skilled in the art.

The method 600 further comprises changing the frequency of the transmit clock (e.g., TX_clock 106b) such that the frequency is less than or equal to TxMaxFreq 120b (block 604). As discussed above, a change in TxMaxFreq 120b causes the transmit clock adapter 104b to generate TX_clock 106b based on the new value in TxMaxFreq 120b. The controller 161b generates N=ceiling (FclkFreq/TxMaxFreq), and causes the TX clock generator 160b to generate TX_clock 106b at a frequency equal to Fclk/N. As above, this particular generation of N is exemplary only, and TX_clock 106b may be generated in other suitable manners. When the controller 161b determines that the frequency of TX_clock 106b is non-transient and settled, the controller 161b copies the value from TxMaxFreq 120b to TxMaxFreqAck 121b, acknowledging that TX_clock 106b is operating at the correct frequency.

The method still further comprises exporting an acknowledgement of TxMaxFreq 120b to a distant IC (block 606). For example, when TxMaxFreqAck 121b is updated by the transmit clock adapter 104b, RxMaxFreqAck 111a of Device A is updated to contain the value of TxMaxFreqAck 121b. This may be accomplished by hardware, a software interrupt, or other process known to those skilled in the art. TxMaxFreqAck 121b being equal to TxMaxFreq 120b indicates that the transport frequency from Device B is guaranteed to be within the maximal ranges specified by the OPP of the distant IC and that Device B has updated TX_clock 106b to facilitate communication with Device A using the new OPP. The method then ends.

Although FIGS. 5 and 6 depict the method steps in a sequential order, the steps may be carried out in any other suitable order. Additionally, certain ones of the method steps may be carried out in parallel with other method steps. One skilled in the art would understand that various different IC operations (e.g., going from OPP1 to OPP2 compared to OPP2 to OPP1) may be accomplished by performing the method steps in an order different than shown in FIGS. 5 and 6.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of changing an operating performance point of an integrated circuit comprising:
   detecting a need to change the operating performance point of the integrated circuit to a new operating performance point;
   changing a voltage of the integrated circuit to correspond with the new operating performance point;
   changing a maximal receiver clock frequency value to correspond with the new operating performance point;
   exporting the maximal receiver clock frequency value to another integrated circuit; and
   receiving an acknowledgement of the changed maximal receiver clock frequency value from the other integrated circuit.

2. The method of claim 1 wherein the voltage is changed as a result of receiving the acknowledgement from the other integrated circuit.

3. The method of claim 1 wherein the maximal receiver clock frequency value is changed as a result of changing the voltage.

4. The method of claim 1 wherein exporting further comprises exporting data and a transmit clock signal.

5. The method of claim 1 wherein receiving further comprises receiving data and a receive clock signal and sampling the data using the receive clock signal.

6. A system comprising:
   a first and second integrated circuit, each comprising:
      a transmit clock adapter configured to change a frequency of a transmit clock;
      a transmitter; and
      a receiver;
   wherein if the first integrated circuit changes to a new operating performance point:
      the first integrated circuit changes a voltage to correspond with the new operating performance point;
      the first integrated circuit changes a maximal receiver clock frequency value to correspond with the new operating performance point; and
      the transmitter of the first integrated circuit exports the maximal receiver clock frequency value to the second integrated circuit; and
   wherein if the receiver of the second integrated circuit receives a changed maximal receiver clock frequency value from the first integrated circuit, being the maximal transmit clock frequency value of the second integrated circuit:
      the transmit clock adapter of the second integrated circuit changes the frequency of the transmit clock such that the frequency is less than or equal to the maximal transmit clock frequency value; and
      the transmitter of the second integrated circuit exports an acknowledgement of the maximal transmit clock frequency value to the first integrated circuit.

7. The system of claim 6 wherein the acknowledgement confirms that the transmit clock frequency is settled.

8. The system of claim 6 wherein the transmit clock frequency is different than a frequency of a local reference clock of the second integrated circuit.

9. The system of claim 6 wherein the first integrated circuit changes the voltage after the second integrated circuit exports the acknowledgement to the first integrated circuit.

10. The system of claim 6 wherein the first integrated circuit changes the maximal receiver clock frequency value after the first integrated circuit changes the voltage.

11. The system of claim 6 wherein the first integrated circuit:
    exports data and a transmit clock signal to the second integrated circuit;
    receives data and a receive clock signal from the second integrated circuit; and
    samples the received data using the receive clock signal.

12. The system of claim 11 wherein the second integrated circuit:
    exports data and a transmit clock signal to the first integrated circuit;
    receives data and a receive clock signal from the first integrated circuit; and
    samples the received data using the receive clock signal.

13. The system of claim 6 wherein the frequency of the transmit clock of the second integrated circuit is not equal to a frequency of a transmit clock of the first integrated circuit.

14. The system of claim 6 wherein:
    one of the first and second integrated circuits further comprises a host processor coupled to the transmitter and receiver of the one of the integrated circuits; and
    the host processor operates at one or more frequencies that are not equal to one or more of the frequencies of the transmit clock of the one of the integrated circuits.

* * * * *